(12) United States Patent
Buuck (10) Patent No.: US 8,593,420 B1
(45) Date of Patent: Nov. 26, 2013

(54) PROVIDING TACTILE OUTPUT AND INTERACTION

(75) Inventor: David C. Buuck, Prunedale, CA (US)

(73) Assignee: Amazon Technologies, Inc., Reno, NV (US)

(*) Notice: Subject to any disclaimer, the term of this patent is extended or adjusted under 35 U.S.C. 154(b) by 216 days.

(21) Appl. No.: 13/040,965

(22) Filed: Mar. 4, 2011

(51) Int. Cl.
*G06F 3/041* (2006.01)
(52) U.S. Cl.
USPC .......................................... 345/173; 345/174
(58) Field of Classification Search
USPC .................. 345/156, 173, 174, 178, 179; 178/18.01, 18.04–18.07, 19.01–19.04; 340/407.1, 407.2
See application file for complete search history.

(56) References Cited

U.S. PATENT DOCUMENTS

| | | | | |
|---|---|---|---|---|
| 6,954,899 B1* | 10/2005 | Anderson | | 715/701 |
| 7,084,867 B1* | 8/2006 | Ho et al. | | 345/419 |
| 7,593,000 B1* | 9/2009 | Chin | | 345/156 |
| 8,199,124 B2* | 6/2012 | Ciesla et al. | | 345/173 |
| 8,315,652 B2* | 11/2012 | Grant et al. | | 455/466 |
| 2002/0132634 A1* | 9/2002 | Hiltunen | | 455/550 |
| 2009/0015549 A1* | 1/2009 | Gelfond et al. | | 345/156 |
| 2009/0251421 A1* | 10/2009 | Bloebaum | | 345/173 |
| 2010/0171720 A1* | 7/2010 | Craig et al. | | 345/173 |
| 2010/0182263 A1* | 7/2010 | Aunio et al. | | 345/173 |
| 2010/0207880 A1* | 8/2010 | Shaver et al. | | 345/158 |
| 2011/0074830 A1* | 3/2011 | Rapp et al. | | 345/677 |
| 2012/0038562 A1* | 2/2012 | Holman et al. | | 345/173 |
| 2012/0038582 A1* | 2/2012 | Grant | | 345/174 |
| 2012/0206248 A1* | 8/2012 | Biggs | | 340/407.2 |

* cited by examiner

*Primary Examiner* — Joe H Cheng
(74) *Attorney, Agent, or Firm* — Lee & Hayes, PLLC (57) ABSTRACT

Some implementations provide tactile output for enabling a device to interact physically with a user. For instance, the device may include a first portion having a display and a touch surface. The first portion may connect to a second portion by one or more connection elements that permit relative movement between the first portion and the second portion. One or more tactile output components in the second portion may impart relative movement in the first portion in one or more directions. For example, the one or more tactile output components may oscillate the touch surface in one or more directions within a plane of the touch surface to provide the tactile output, while the connection elements restrict movement of the touch surface in a direction normal to the touch surface.

32 Claims, 8 Drawing Sheets

PROVIDING TACTILE OUTPUT AND INTERACTION

BACKGROUND

People commonly use electronic devices for consumption of digital media content, such as images, movies, music, electronic books (eBooks), audio books, and so forth. Examples of such electronic devices may include eBook reader devices, cellular telephones, tablet computers, portable media players, netbooks, personal digital assistants (PDAs), and the like. However, user interfaces for such electronic devices traditionally engage a limited number of human senses. For instance, users are able to view images presented on displays and hear sounds generated by speakers, but tactile or haptic output has typically been limited to simple shakes or buzzes. As digital content continues to increase in popularity, and as electronic devices for consuming digital content become more and more common, providing ways to enhance the user experience continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Tactile Interaction

This disclosure includes techniques and apparatuses for enabling a user to interact physically with an electronic device. In some implementations, the electronic device may provide haptic or tactile output for enabling the user to interact with content on the device. In some implementations, the tactile output may be provided by lateral translation of a surface, such as in a shear mode. For example, the tactile output may be provided by movement of a touched surface in one or more directions within a plane of the surface. Further, the electronic device may provide tactile output of different types as the user is touching a surface, such by providing different types of movement, oscillation, or excitation. In some cases, by varying intensities, amplitudes, directions or other types of vibrotactile stimulation, the electronic device may simulate different textures, contours, shapes, or other touch sensations.

According to some implementations, an example device for providing tactile output and interaction to a user may include a first portion that is moveable relative to a second portion. For example, the first portion may include a display and the second portion may include other components of the device, such as a control unit, power source, and the like. In some instances, the display may have an associated touch sensor for sensing a touch input from a user. The first portion and the second portion of the device may each be independently sealed to protect components from contamination or damage. The first portion and the second portion may connect to each other to form a unitary device by one or more elastic or flexible connections that enable movement or oscillation of the first portion relative to the second portion. In some implementations, the relative movement may be essentially limited to one or more directions, such as lateral movement generally in a plane of the display or the touched surface, while restricting movement in one or more other directions, such as a direction normal to the plane of the display or the touched surface.

In some implementations, the device may provide lateral or shear-mode excitation of a touch surface, such as a surface of a display and/or touch sensor that a user of the device touches. For example, when the user touches a touch surface on the device, the touch surface may be excited, vibrated, oscillated, or the like, in a direction that is oblique or approximately perpendicular to the direction of pressure applied by the user's finger. For instance, if the user's finger generally applies a touch pressure along a z-axis direction when touching a touch surface that is disposed in an x-y plane, the movement of the touch surface may take place in one or both of the x-axis and y-axis direction, i.e., in at least one direction in a plane of the surface being touched. Thus, in these implementations, there may be a negligible amount movement of the touch surface in the z-axis direction. Limiting the vibrotactile output to a lateral movement also limits the sound produced by the tactile output. For example, excitation of the touch surface in the z-axis direction can create pressure waves, resulting in a loudspeaker-type effect, which may generate undesirable noise.

Further, the tactile output may be controlled and manipulated to achieve various effects and sensations, such as to enable a user to feel textures, contours or shapes based on varying intensities and modes of the tactile output. For instance, the tactile output may simulate the sensations of touching a raised surface, touching paper, turning a page, pressing a button, or the like. In some implementations, a user dragging a finger across the display may achieve rate-based effects. For example, the device may determine a direction vector and rate of the drag and the device may vary the tactile output to create textures, contours or other sensations. Thus, determining a rate and direction of the user's finger may allow for detailed vibrotactile effects. Additionally, in some instances, a lookup table may be used that specifies various different tactile outputs in response to different detected vectors, rates, pressures and other types of touch inputs.

As mentioned above, haptic or tactile output provided by most electronic devices has been limited. Traditional tactile output components provide coarse haptic output such as buzzes or vibrations. For example, a typical conventional tactile output component may consist of a vibrator with a rotary motor coupled to an eccentric weight that, when spun, generates a vibration. On the other hand, according to some implementations herein, one or more precisely controlled tactile output components may provide the tactile output. In some implementations, the tactile output may occur in at least one direction in a plane of a display. In other implementations, the tactile output may occur in multiple directions in the plane of the display. For example, one or more tactile output components may be activated in response to sensing a touch input from a user for exciting the touched surface.

The techniques described herein may apply to a variety of different types of content items, such as, eBooks, still images, videos, audio books, music, maps, and so on. In some implementations, the type of tactile output provided may be dependent, at least in part, on the content currently being consumed or displayed by the electronic device. For example, metadata may be provided with the content for specifying different types of tactile output based on different detected touch inputs. Further, in some implementations, the type of tactile output provided may be dependent, at least in part, on a location that the user touches. For instance, if the device is currently displaying multiple virtual items, features, or the like, the device may provide different tactile output based on which virtual item or feature the user touches. In some instances, the tactile output may also vary according to an amount of force applied by a user and detected by a touch sensor associated with the display.

The foregoing discussion is provided for the reader's convenience and is not intended to limit the scope of the claims or the disclosure herein. Furthermore, the techniques described above and below may be implemented in a number of ways and in a number of contexts. Several example implementations and contexts are provided with reference to the figures, as described below in more detail. However, the following implementations and contexts are but a few of many.

Example Electronic Device

Figure 1:
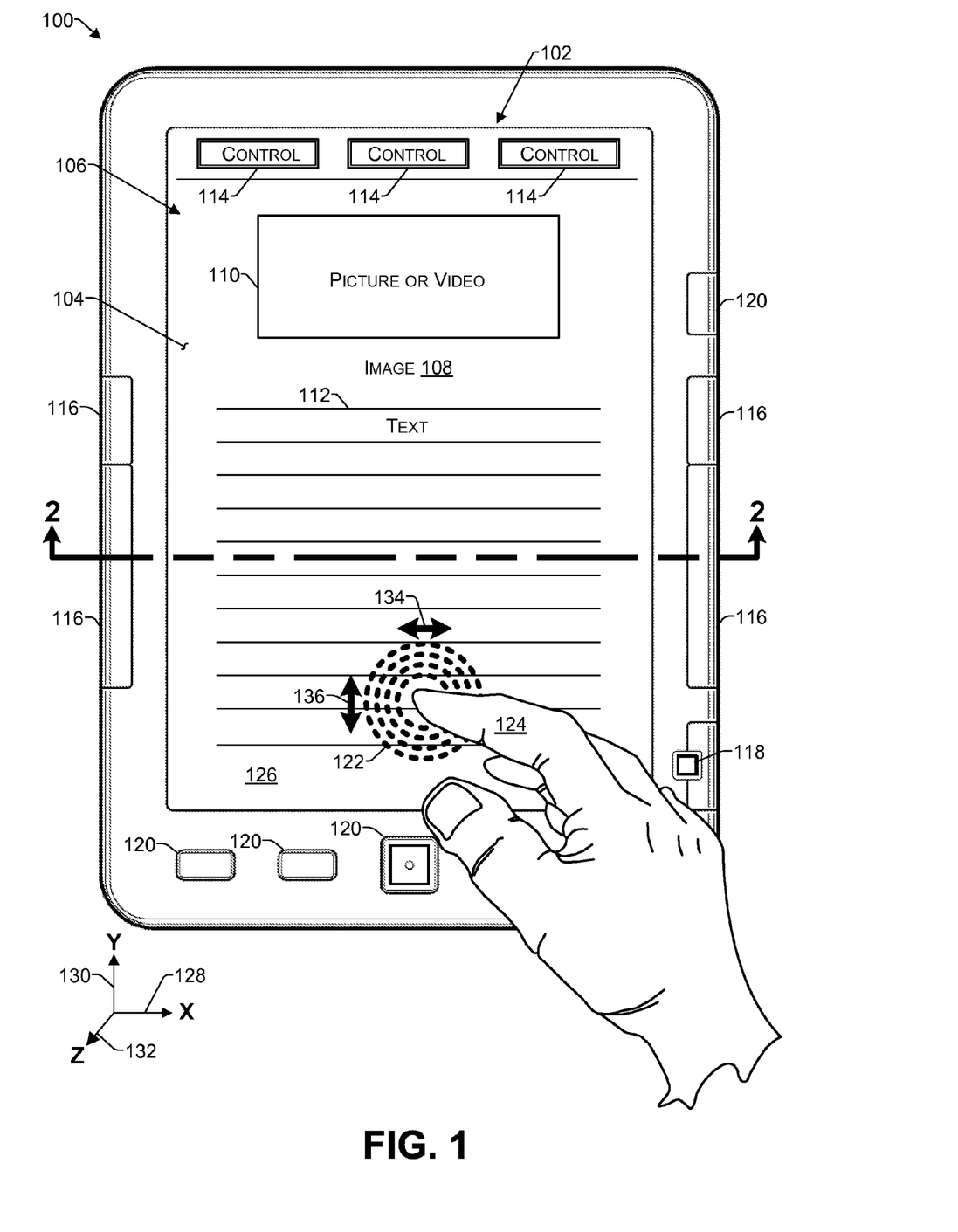
FIG. 1 is an example of an electronic device to provide tactile interaction according to some implementations.

FIG. 1 depicts an example of an electronic device 100 for providing tactile interaction according to some implementations. In some instances, the electronic device 100 may be a portable or hand-held electronic device. In other instances, the electronic device 100 may be a fixed or generally non-lee portable device. Non-limiting examples of electronic device 100 may include eBook readers, cellular phones, portable media players, navigation devices, tablet computing devices, personal computers, netbooks, laptops, cash registers, kiosks, touch screens, and so forth.

The electronic device 100 includes a display 102 configured to present information to a user. A touch sensor 104 may be associated with the display 102 for receiving a user touch input. In some implementations, the touch sensor 104 may be adjacent to or integrated with the display 102 to form a touchscreen. For example, when the electronic device 100 is used to consume a content item 106, the display 102 may display an image 108 associated with the content item 106. Numerous different types of images may be displayed in association with various content items, such still pictures, video or moving images, text, interactive buttons, virtual controls, and the like. For instance, as illustrated in the example of FIG. 1, the image 108 may include features such as a picture or video 110, readable text 112, and/or buttons or virtual controls 114. Further, in some implementations, a portion of the displayed image 108 may be associated with one or more content items, while another portion of the displayed image may be associated with an operating system of the electronic device. For example, certain virtual controls or image features, such as controls 114 may be displayed by the operating system, while other image features, such as text 112 and/or picture or video 110 may be displayed by one or more content items 106. Thus, implementations herein are not limited to use with a particular type of image. Additionally, in some implementations, electronic device 100 may include one or more physical controls, such as page-turn buttons 116, a power-on switch 118, and control buttons 120, and the like. However, in other implementations, the physical controls 116-120 may be eliminated, located on a backside the electronic device 100, or the like.

In FIG. 1, a tactile output 122 is represented by broken lines and may be produced by one or more tactile output components (not shown in FIG. 1). For example, a user may touch a finger 124 or other body part to a touch surface 126, which may be the surface of display 102 and/or touch sensor 104, or a protective coating over the display 102 and/or touch sensor 104. The electronic device 100 may produce the tactile output 122, which is felt by the finger 112 while touching the touch surface 126. In some instances, the tactile output 122 may include movement, vibration or oscillation of the touch surface 126 in one or more directions. For example, an orientation for discussion purposes may include an x-axis 128, a y-axis 130 and a z-axis 132, such that the touch surface 126 may be generally aligned with the x-axis 128 and the y-axis 130, and the z-axis 132 may be generally normal or perpendicular to the touch surface 126. Thus, the tactile output 122 may be generally in one or more directions in the same plane as a plane the touch surface 126, such as an x-axis direction as indicated by arrow 134 and/or a y-axis direction, as indicated by arrow 136. Further, it should be noted that arrows 134, 136 are not to scale and the actual movement or oscillation of touch surface 126 may be less than a millimeter in any direction. For example, in some cases, the movement or oscillation may be approximately 250 microns or less.

In some implementations, the touch surface 126 may be excited or oscillated in one or more directions in the plane of the touch surface 126 while the user's finger 124 is touching or sliding along the surface. Additionally, in some implementations herein, there may be no movement or negligible movement of the touch surface 126 in the z-axis direction. Further, the tactile output 122 may change or vary while the user's finger 124 is in contact with the surface. For instance, the tactile output 122 may increase in intensity, frequency, change direction, or the like, as a user's finger 122 remains in contact with the touch surface 126, or moves from one location to another location by sliding on touch surface 126. Further, separate touches at different locations or the same location may result in different tactile outputs. Numerous variations will be apparent to those of skill in the art in view of the disclosure herein.

Figure 2:
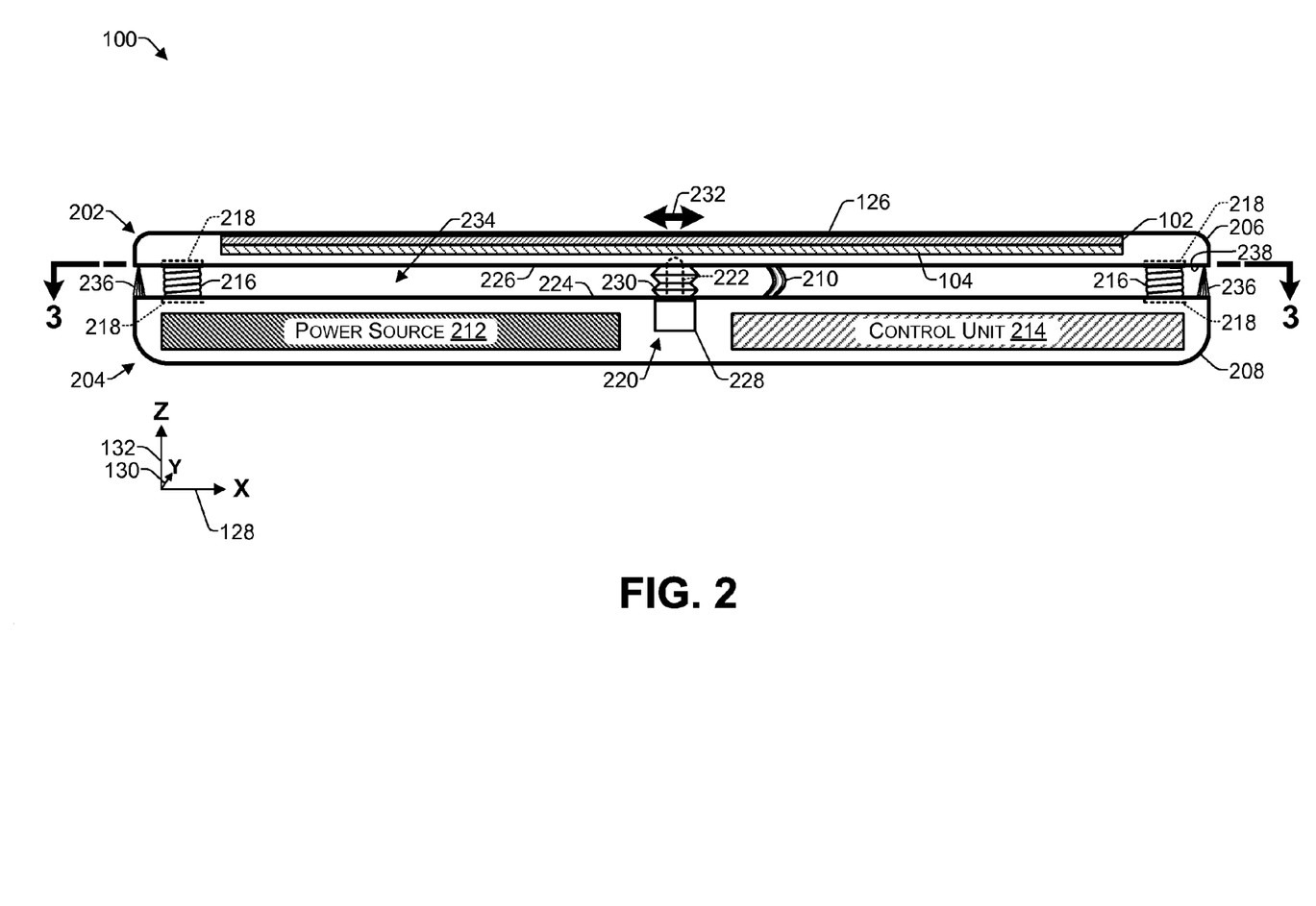
FIG. 2 illustrates a cross-section view according to some implementations of the example electronic device of FIG. 1, as taken along line 2-2 of FIG. 1.

FIG. 2 illustrates a cross-section view according to some implementations of the example electronic device 100 of FIG. 1, as taken along line 2-2 of FIG. 1. For clarity of illustration, the physical controls 116-120 are not shown in FIG. 2. In the illustrated example, the electronic device 100 includes an upper or first portion 202, and a lower or second portion 204. The first portion 202 and the second portion 204 may be in operative communication through a flexible umbilical connection 210, or other suitable type of connection. Each of the first portion 202 and second portion 204 may be separate units or elements environmentally sealed to protect the components thereof. For example, the first portion 202 may be contained in a first housing 206, while the second portion 204 may be contained in a second housing 208.

First portion 202 may include the display 102 and touch sensor 104 described above, mounted in first housing 204 for access and viewing by a user. In some implementations, touch sensor 104 may be located under display 102. In other implementations, the locations of touch sensor 104 and display 102 may be reversed, while in yet other implementations, touch sensor 104 may be an integral part of display 102.

Second portion 204 may include a power source 212 and a control unit 214. For example, power source 212 may be a battery or other energy source to provide power to the electronic device 100. Control unit 214 may be inclusive of any of a number of components for controlling and providing the operating functions of the electronic device 100, such as a main board, a processor, a memory, a graphics processing unit, a touch sensor controller, communication interfaces, removable storage, and the like, as discussed additionally below with reference to FIG. 7.

Umbilical 210 may be a thin, flexible connection that enables transmission of power and functional information between the first portion 202 and the second portion 204. For instance, display information, such as image information to be displayed on display 102 may be provided to display 102 from control unit 210 through the umbilical 210. Similarly, touch information registered by touch sensor 104 may be transferred through umbilical 210 to control unit 214. Further, input information from the physical controls and buttons 116, 118, 120 (not shown in FIG. 2) may be similarly transferred through the umbilical 210 to control unit 214. Additionally, power source 212 may provide power to the first portion 202 through the umbilical 210, as well providing power to the control unit 214.

In the illustrated example of FIG. 2, first portion 202 is mounted on or otherwise physically connected to second portion 204 in such a manner as to enable movement of the first portion 202 relative to the second portion 204. In some implementations, the first portion 202 is able to move relative to the second portion 204 in at least one of the x-axis or y-axis directions, but is restricted from movement in the z-axis direction. For example, the first portion 202 may be mounted to the second portion 204 using one or more connection elements or springs 216. In an example implementation, four springs 216 may be used to fasten the first portion 202 to the second portion 204. In this implementation, each spring 216 may be fixed in a shallow recess 218 at each corner of the first housing 206 and second housing 208, as described additionally below. Springs 216 may be tension-type springs of sufficient stiffness to keep first portion 202 aligned with second portion 204. Further, springs 216 may have sufficient flexibility such that first portion 202 is able to move, vibrate, or oscillate relative to the second portion 204 in the x-y plane. Additionally, while springs 216 are shown in the example of FIG. 2, numerous other types of fasteners and connections may be used to attach the first portion 202 to the second portion 204 in a manner to allow relative movement of the first portion 202 in the x-y plane, as will be apparent to those of skill in the art in light of the disclosure herein.

One or more tactile output components 220 may be included in the second portion 204. For example, tactile output component 220 may include a linkage 222 that extends through an upper wall 224 of second housing 208 and into contact with a lower wall 226 of first housing 206. Tactile output component 220 may include a drive enclosure 228 that includes one or more motive elements described below that may be activated to cause linkage 222 to induce movement of the first portion 202 relative to the second portion 204. A flexible bellows or boot 230 may enclose the linkage 222 to provide additional sealing of the openings in the upper housing wall 224 and the lower housing wall 226.

In some implementations, to produce the tactile output 122 described above, one or more tactile output components 220 may be activated to move or oscillate the first portion 202 of the electronic device 100 relative to the second portion 204 of the electronic device 100 in one or more directions, such as is indicated by arrow 232. For example, the second portion 204 may have a substantially higher mass than the mass of first portion 202. In some implementations, the second portion 104 may have a mass four or more times greater than the mass of the first portion 102. Accordingly, in some instances, the first portion 202 is made lightweight by moving most functional components to the second portion 204. For example, a display controller and or touch sensor controller may be located in the control unit 214 in second portion 204, rather than adjacent to the display or touch sensor in the first portion 202. Additionally, in some implementations, to further lighten the first portion 202, some or all of the physical controls 116, 118, 120 may be eliminated or located in the second portion 204. For example, many of the physical controls 116, 120 may be replaced with virtual controls displayed on the display 102. Other physical controls, such as power switch 118 may be located on a side or back surface of second portion 204. Numerous other configurations are possible to reduce the mass of the first portion 202 so that movement is imparted into the first portion 202, while the second portion 204 remains relatively stationary and immobile.

Furthermore, while a gap 234 between the first portion 202 and the second portion 204 may be minimal in most cases (e.g., approximately 1 mm in some implementations), a seal 236 may be provided around a perimeter 238 of the gap 234 to prevent entry of foreign objects or material into the gap 234. In some implementations, the seal 236 may be a bristle or brush type seal or other suitable seal enabling relative movement between the first portion 202 and lower portion 204. In the case of a bristle seal 236, a suitable seal type may include silicon carbide fibers, nylon fibers, polypropylene fibers, or the like. Alternatively, other suitable seal types may include channel seals, bellows seals, or other types of seals permitting relative movement between two opposed bodies.

Figure 3:
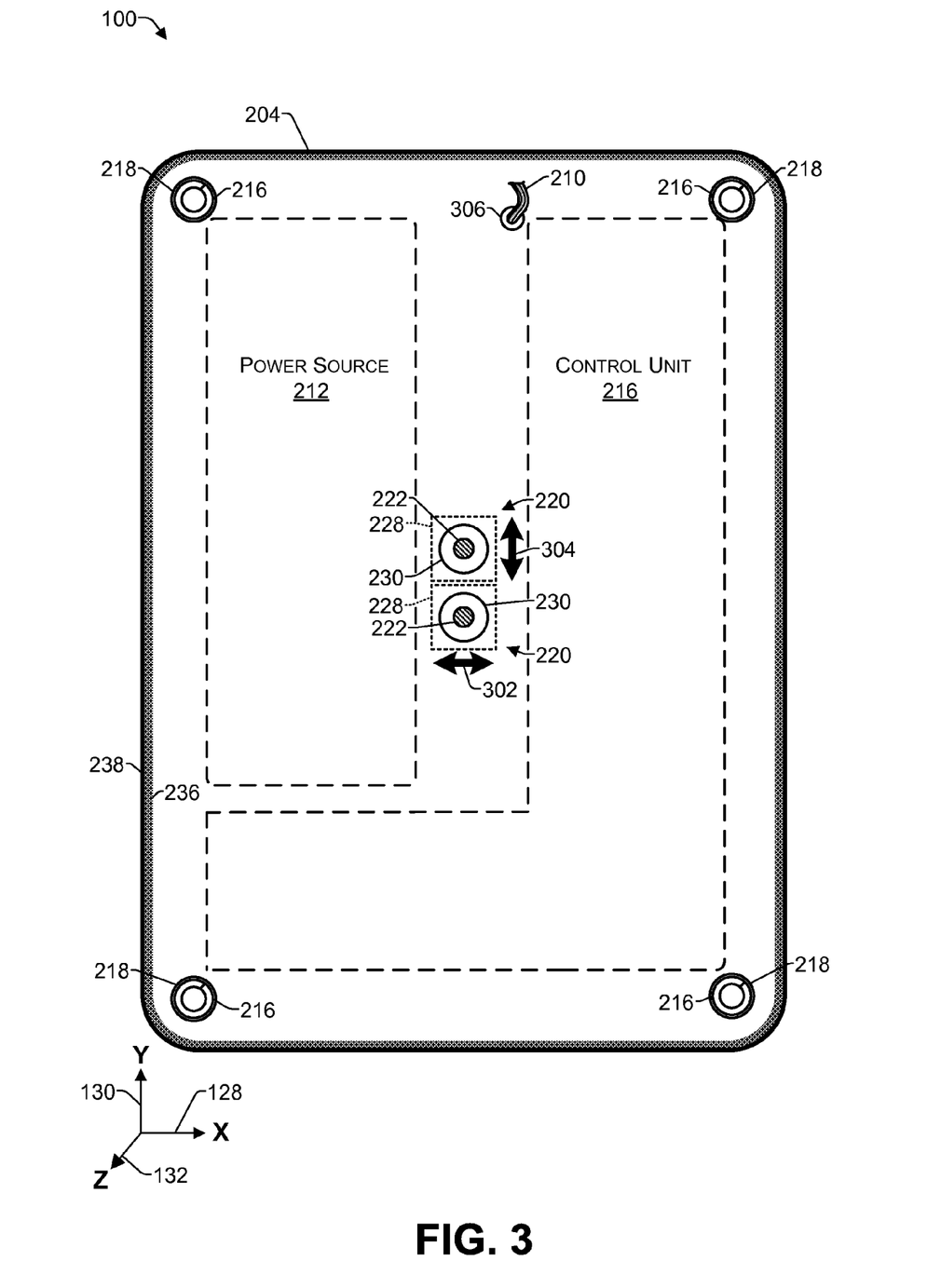
FIG. 3 illustrates a cross-section view of the example electronic device of FIG. 1, as taken along line 3-3 of FIG. 2.

FIG. 3 illustrates a cross-section view of the example electronic device 100 of FIG. 1, taken along line 3-3 of FIG. 2, and that includes a plan view of the second portion 204. In the illustrated example, two tactile output components 220 are provided in lower portion 204. For example, a first tactile output component 220 may provide oscillation in the x-axis direction, as indicated by arrow 302. Further, a second tactile output component 220 may provide oscillation in the y-axis direction, as indicated by arrow 304. Additionally, in other implementations, only a single tactile output component 220 may be provided, such as for providing oscillation in only the x-axis or y-axis direction. Further, in other implementations, a single tactile output component 220 may be provided capable of providing oscillation in both the x-axis and y-axis directions, or any combination of those directions. Further, while the illustrated example shows the direction of oscillation as being aligned with one of the x-axis or y-axis, in other instances, the direction of oscillation may be oblique to one or both of the x-axis or y-axis. Additionally, in some implementations, oscillation may also be provided in the z-axis direction in addition to, or in place of, the oscillation in the x-axis or y-axis directions. Other variations will also be apparent to those of skill in the art in light of the disclosure herein.

FIG. 3 further illustrates an example configuration in which four springs 216 are employed as fasteners, one in each corner of the second portion 204, for fastening the first portion 202 (not shown in FIG. 3) to the second portion 204. However, in other implementations, more or fewer springs 216 may be used for connecting the second portion 204 to the first portion 202. Additionally, numerous other types of fastening and suspension systems may be used in place of, or in addition to springs 216. FIG. 3 also illustrates that umbilical 210 may enter lower portion 204 through a grommet 306 or other suitable seal to prevent contamination of the components located in the second portion 204. First portion 202 may include a similar grommet (not shown) for the entry point of umbilical 210 into first portion 202. In other cases, for ease of assembly, instead of passing through a grommet, one end of umbilical 210 may include a connector for connecting to a matching socket in one of first portion 202 or second portion 204.

Figure 4:
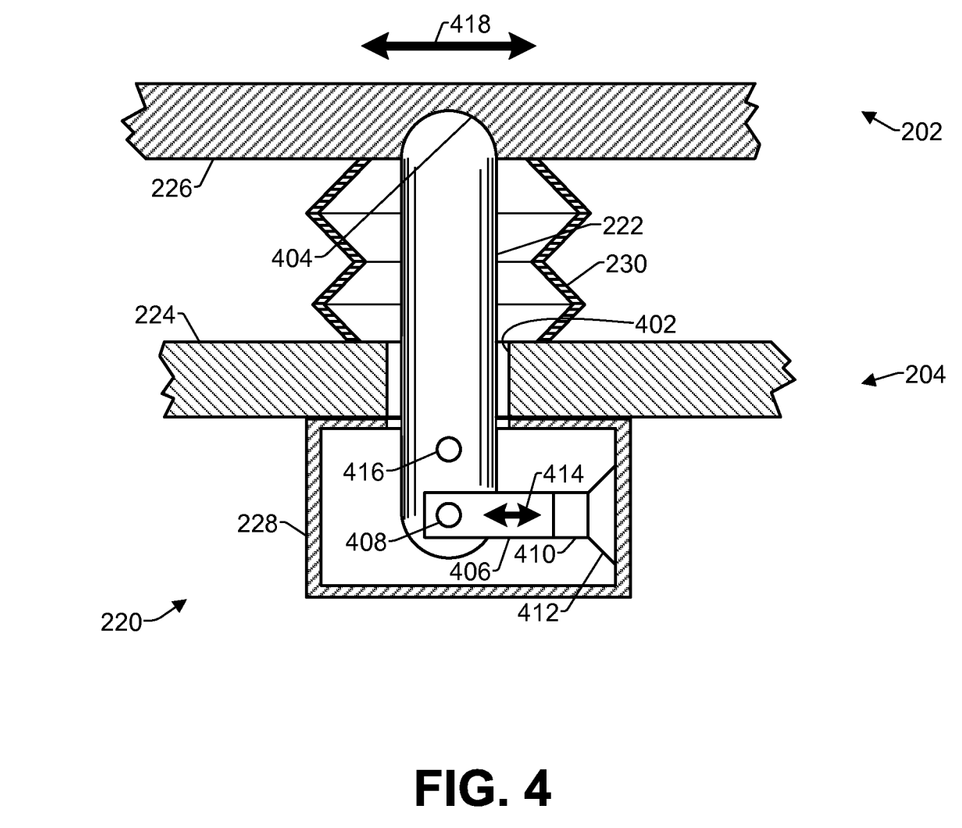
FIG. 4 illustrates an elevation cross-section detail of an example tactile output component.

FIG. 4 illustrates an elevation cross-section view of depicting additional details of an example tactile output component 220 according to some implementations herein. In the example of FIG. 4, linkage 222 passes through an opening 402 in the upper wall 224 of the second portion 204 and fits within a socket 404 formed in the lower wall 226 of the first portion 202. Linkage 222 is also connected to a drive shaft 406 by a pin connection 408. A motive device or element 410 may be connected to drive shaft 406 and a mount 412. Motive device or element 410 may be a suitable type of mechanism for causing movement or oscillation in the directions of arrow 414. This movement causes the linkage 222 to pivot around a pivot point 416, thereby imparting relative movement into the first portion 202, as indicated by arrow 418. Non-limiting examples of suitable motive devices or elements 410 include piezoelectric crystals and other piezoelectric elements, solenoids, artificial muscle elements (e.g., electro-active polymers), electric motors, fluid motors, transducers, or other devices capable of generating a controllable high-speed oscillation or vibration. For instance, by controlling the frequency and/or amplitude of the oscillation of motive element 410, various different tactile output effects can be achieved. Additionally, while FIG. 4 sets forth details of one example of a suitable tactile output component, various other configurations for tactile output component may be used in implementations herein. For example, the springs 216 or other suspension elements may incorporate tactile output components capable of inducing motion of the first portion 202 in the x-y plane. Accordingly, implementations herein are not limited to the particular configuration of the example tactile output component 220 illustrated in the figures.

Figure 5:
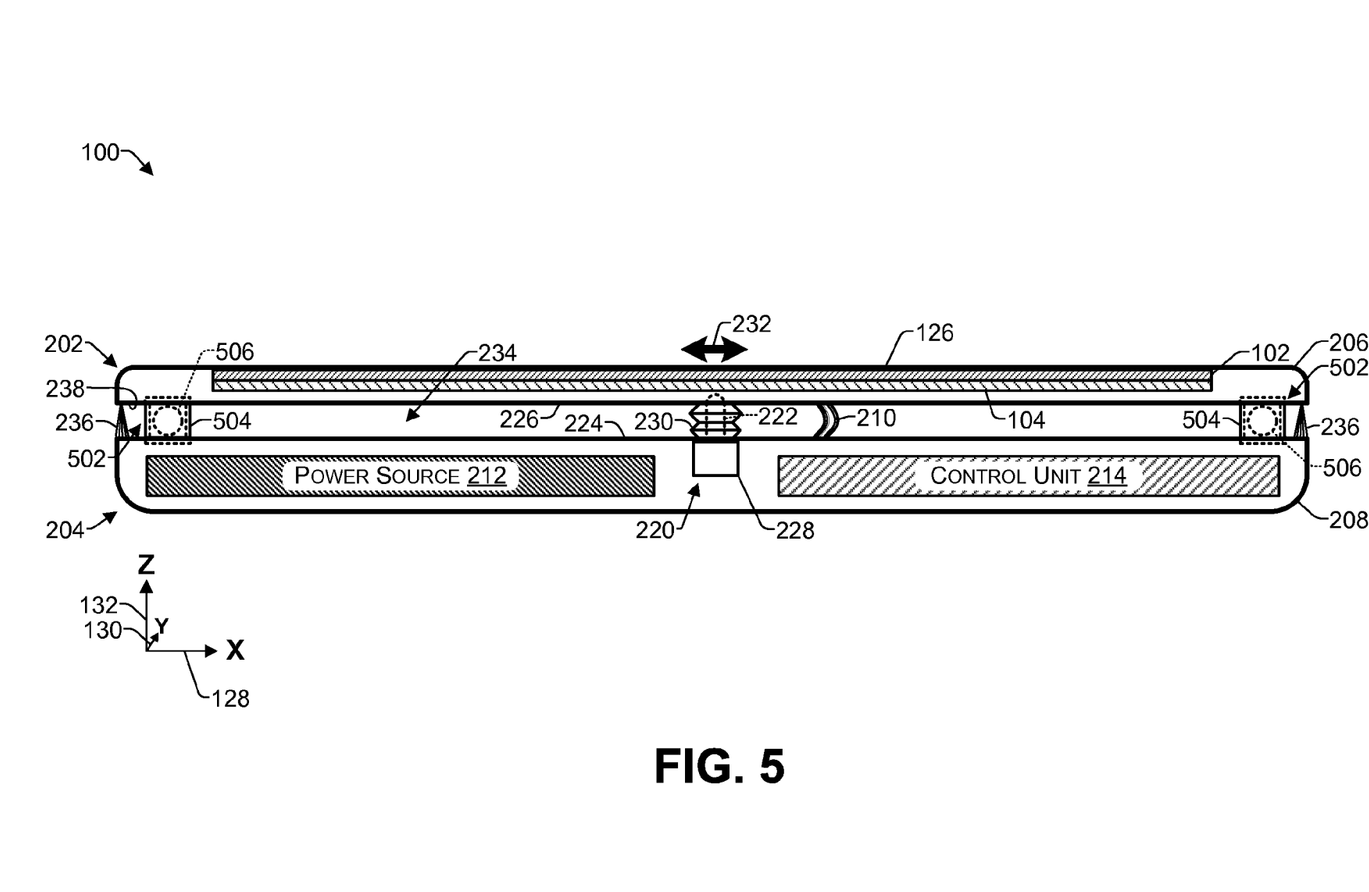
FIG. 5 illustrates a cross-section view according to some implementations of the example electronic device of FIG. 1, as taken along line 2-2 of FIG. 1.

FIG. 5 illustrates a cross-section view according to some implementations of the example electronic device 100 of FIG. 1, as taken along line 2-2 of FIG. 1. In the implementation illustrated in FIG. 5, rather than using springs 216 as connection elements to connect the first portion 202 to the second portion 204, one or more ball-and-sleeve connectors 502 may be used as connection elements. For example, each ball-and-sleeve connector 502 includes a flexible sleeve 504 that fastens the upper portion 202 to the lower portion 204. A bearing ball 506 contained within each sleeve 504 maintains the gap 234 between the upper portion 202 and the lower portion 204 at a constant dimension. The flexible sleeves 504 are sufficiently flexible to permit oscillation of one millimeter or less in the x-y plane. Accordingly, the ball-and-sleeve connectors 502 permit the first portion 202 to move in the x-y plane relative to the second portion 204, while preventing movement in the z-axis direction. In some implementations, the flexible sleeves 504 may be polymer, such as silicone, polypropylene, polychloroprene, or other suitable flexible polymers. Bearing ball 506 may be nylon, polyethylene, stainless steel, or the like. The flexible sleeve 504 may fasten to the first portion 202 and the second portion 204 using any suitable fastening technology, such as adhesives, mechanical fasteners, molded grooves in the housing walls, or the like, for securely connecting the first portion 202 to the second portion 204. Further, while springs 216 and ball-and-sleeve connectors 502 have been described as two suitable types of connection elements, numerous other configurations for suitable connection elements and systems will be apparent to those of skill in the art in view of the disclosure herein.

Figure 6:
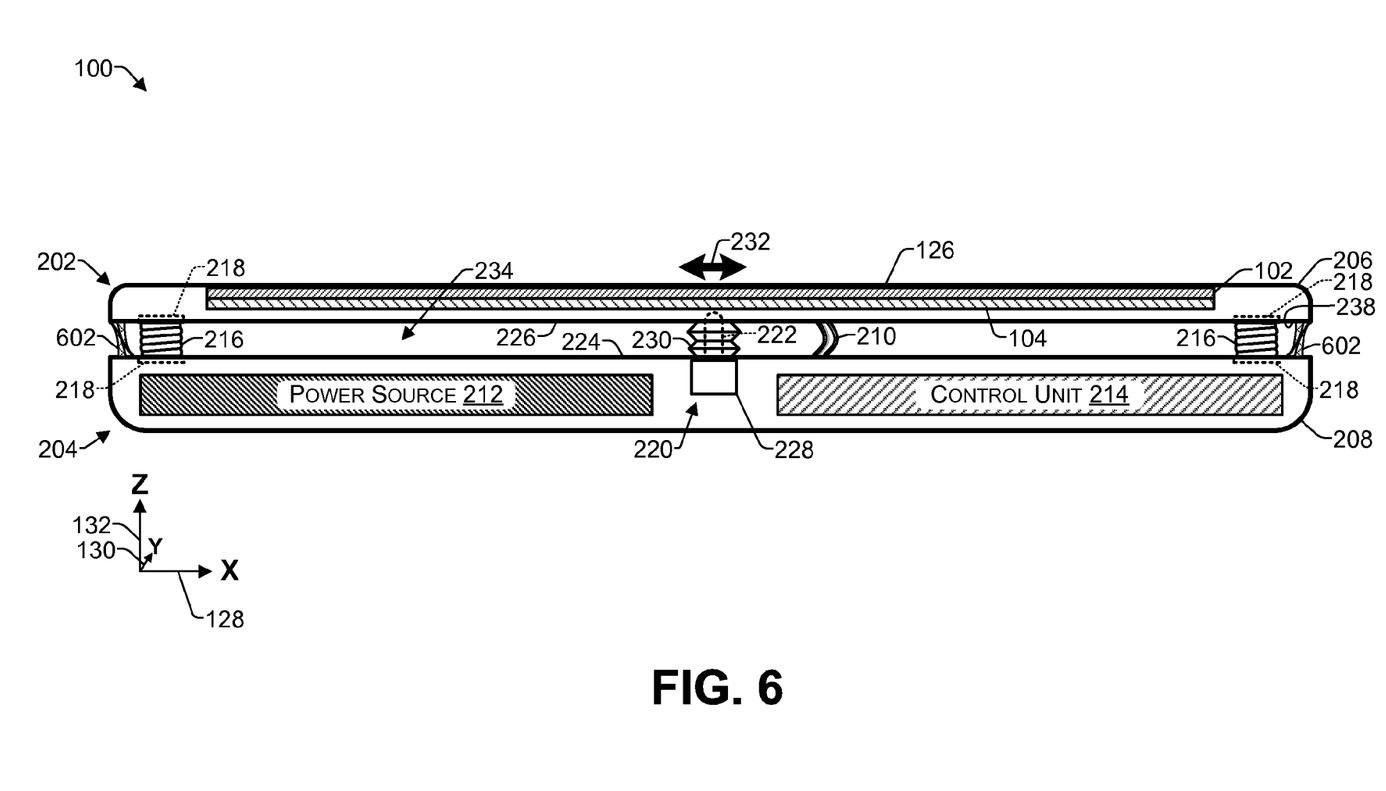
FIG. 6 illustrates a cross-section view according to some implementations of the example electronic device of FIG. 1, as taken along line 2-2 of FIG. 1.

FIG. 6 illustrates a cross-section view according to some implementations of the example electronic device 100 of FIG. 1, as taken along line 2-2 of FIG. 1. In the implementation illustrated in FIG. 6, rather than using a brush seal 236 around the perimeter 238 of the first housing 206 and the second housing 208, a pair of flexible tapered seals 602 may be used. For example, each tapered seal 602 may be a flexible seal that tapers to a thin edge that contacts an opposing wall (e.g., upper wall 224 or lower wall 226), while also contacting a mating seal extending from the opposing wall (e.g., upper wall 224 or lower wall 226). One or more air passages (not shown) may be provided through the pair of flexible tapered seals 602 to enable the air pressure inside gap 234 to remain equalized with the ambient air pressure external to the electronic device 100. Accordingly, the pair of flexible tapered seals 602 may also serve to keep foreign objects and material out of gap 234, while still permitting relative movement between first portion 206 and second portion 208. In some implementations, each tapered seal 602 may be a thin walled extruded seal made from a flexible polymer such as silicone, polypropylene, polychloroprene, or other suitable flexible material. Tapered seals 602 may fasten to the first portion 202 and the second portion 204 using any suitable fastening technology, such as adhesives, mechanical fasteners, molded grooves in the housing walls, or the like. Further, while several examples of suitable seals have been described herein, numerous other suitable seal configurations will be apparent to those of skill in the art in view of the disclosure herein. Accordingly, implementations herein are not limited to the particular configurations described in the examples.

Example Electronic Device Components

Figure 7:
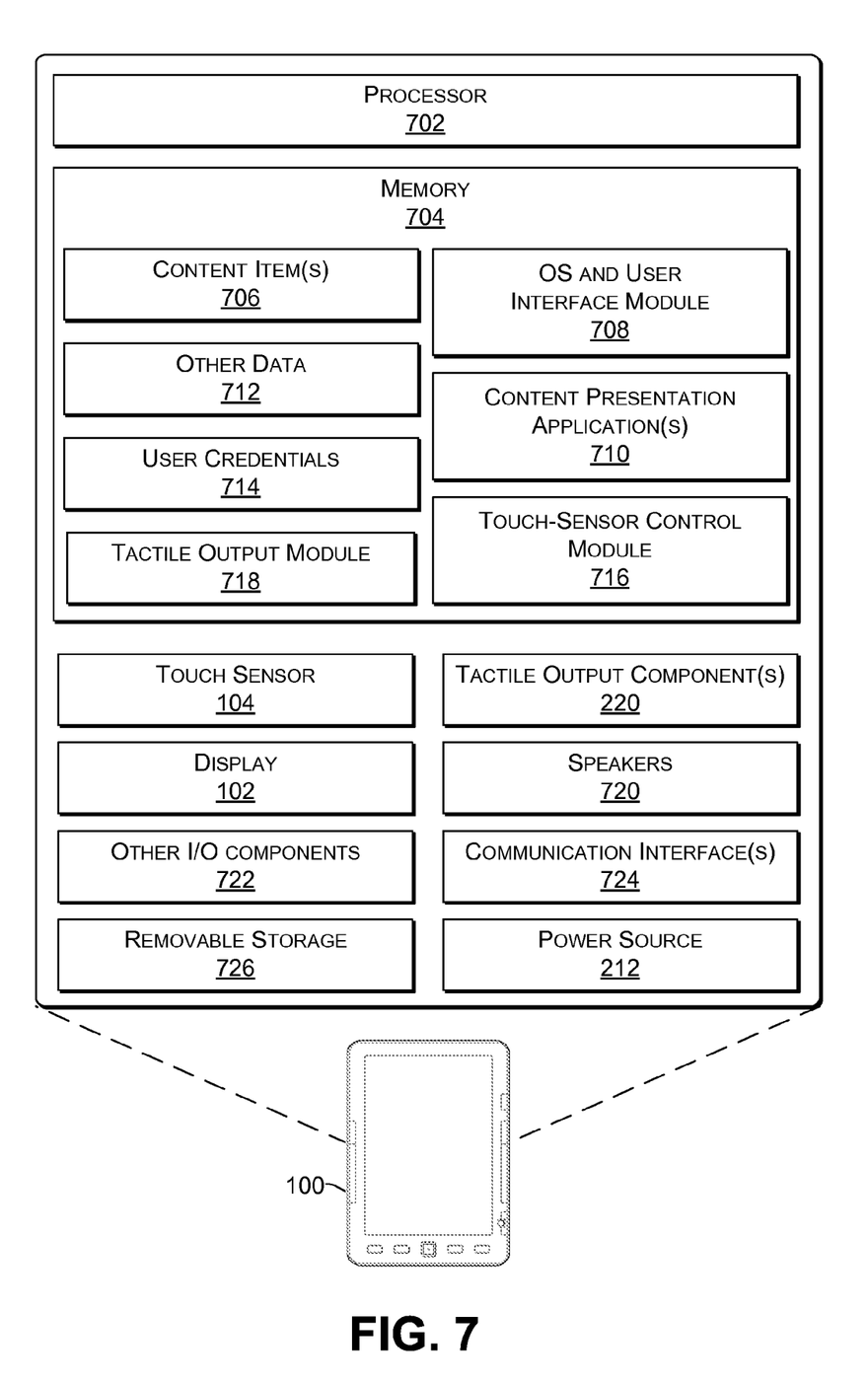
FIG. 7 is a block diagram illustrating selected example modules and components of an electronic device able to provide tactile interaction.

FIG. 7 is a block diagram 700 of select example components of the electronic device 100 according to some implementations. In a very basic configuration, the electronic device 100 includes or accesses components such as at least one processor 702 and a memory 704. Each processor 702 may itself comprise one or more processors or cores. Depending on the configuration of the electronic device 100, the memory 704 may be an example of non-transitory computer-readable media and may include volatile and nonvolatile memory, mass storage, or the like. For instance, the memory 704 may include, but is not limited to, RAM, ROM, EEPROM, flash memory, solid-state drives, magnetic disks, or other memory or storage technology. Thus, the memory 704 may include any medium that can be used to store computer-readable instructions and data that can be accessed by the electronic device 100.

The memory 704 may store any number of functional components that are executable on the processor 702, as well as data and content items that are used or rendered by the electronic device 100. Thus, the memory 704 may store one or more content items 706, such as eBooks, audio books, songs, videos, still images, and the like. In some implementations, the memory 704 may further include a memory portion designated as an immediate page memory (not shown) to temporarily store one or more pages of an electronic book or other content item 706. The pages held by the immediate page memory are placed therein a short period before a next page request is expected.

The memory 704 may store an operating system (OS) and user interface module 708 that is executable by the processor 702. For example, the operating system may include a kernel operatively coupled to one or more device drivers and may provide a user interface for enabling a user to access functions and features of the electronic device 100. One feature of the OS and user interface module 708 allows a user to select one or more of the content items 706 for consumption on the electronic device 100. For instance, the OS and user interface module 708 may allow the user to scroll through a list of available content items 706 for selecting a particular content item 706 to consume, such as by displaying, playing, or the like. The OS and user interface module 708 may facilitate textual entry of a selection (e.g., via a cursor, controller, keyboard, virtual controls, etc.), audible entry of a selection (e.g., via a microphone), or entry of a selection in any other manner. The OS and user interface module 708 may provide menus and other navigational tools to facilitate selection and rendering of the content items 706. The interface module 708 may further include a browser or other application that facilitates access to sites over a network, such as websites or online merchants.

One or more content presentation application(s) 710 may be provided for rendering the content items 706. The content presentation application(s) 710 may be implemented as various applications depending upon the content items. For instance, the application(s) 710 may include an electronic book reader application for rendering electronic books, images, etc., an audio player for playing audio books or songs, a video player for playing video, and so forth. The memory 704 may also store other data 712 in addition to content items 706. Examples of other data 712 may include executable programs and associated data, databases, user settings, configuration files, device status, and so forth.

The memory 704 may also store user credentials 714. The user credentials 714 may be device-specific (set during manufacturing) or provided as part of a registration process for a service. The credentials 714 may be used to ensure compliance with digital rights management (DRM) aspects of rendering the content items 706. In some implementations, different users may sign into the device under separate accounts and may have tactile output settings customized according to different user preferences.

The memory 704 also may store a touch-sensor control module 716 to detect touch inputs received via the touch sensor 104. The touch-sensor control module 716 may be configured to accept input from the touch sensor 104 to determine characteristics of user interaction with the touch sensor 104. These characteristics may include the location of one or more touch inputs on the touch sensor 104, a magnitude of the force of a touch input, a shape of the touch input, a direction (vector) of a finger drag, a rate of a finger drag, a duration of a touch input, and so forth. In some instances, the touch-sensor control module 716 is configured to detect multiple touches on the touch sensor 104 as well as to determine a location, measure an amount of force of each of the touches, and the like.

The electronic device 100 of FIG. 7 further includes the touch sensor 104 described above, which enables a user to operate and interact with the electronic device 100 via touch inputs. In one implementation, the touch sensor 104 may be placed behind the display 102, such that user touch input made through contact relative to the display 102 may be sensed by the touch sensor 104. In another implementation, the touch sensor 104 may be placed in front of the display 102, or in another part of the device altogether. In some instances, the touch sensor 104 and the display 102 are integral to provide a touch-sensitive display that displays content items 706 and allows users to navigate the content items 706 via touch inputs on the display 102.

FIG. 7 further illustrates the display 102, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 102 may be an active display such as a liquid crystal display, plasma display, light emitting diode display, organic light emitting diode display, and so forth. These displays may comprise drive electronics, such as a display drive matrix configured to affect individual pixels within the display 102. In some implementations, the display 102 may be a 3D display capable of providing a 3D image. For example, the display 102 may produce a 3D image by providing alternating left-eye and right-eye images with or without the use of shuttering or filtering eyeglasses. Other techniques for providing a 3D image include providing a stereoscopic image or an autostereogram.

In some implementations, multiple displays 102 may be present on the electronic device 100. When multiple displays are present, these displays may be of the same or different types. For example, one display may be an electrophoretic display while another may be a liquid crystal display. For convenience only, the display 102 is shown in a generally rectangular configuration. However, it is understood that the display 102 may be implemented in any shape, and may have any ratio of height to width.

FIG. 7 further illustrates that the memory 704 stores a tactile output module 718 that is executable on the processor 702 to determine tactile output that will be provided to a user for interaction with the user. In some implementations, the tactile output module 718 may be part of the operating system and user interface 708, while in other implementations, the tactile output module 718 may be a separate module or application. Tactile output module 718 may receive, through touch-sensor control module 716, information regarding one or more touch inputs detected by the touch sensor 104. Tactile output module 718 may determine suitable tactile output to be provided based on the content item 706 currently being displayed and the location, force or other characteristics of the received touch input information. For example, tactile feedback module 118 assesses any content item 706 or virtual control currently being rendered on display 104 in conjunction with the touch location, touch force, touch direction, rate of drag, or the like received from the touch sensor 104 for determining a tactile output.

In some implementations, the content item 706 may include metadata that specifies a particular tactile output to be provided based on the touch characteristics detected. In other implementations, the tactile output module 718 may use a recognition process for determining a suitable output based on the input from the touch sensor 102 and a displayed feature or control proximate to the touch input. For example, the tactile output module 718 may correlate the detected touch location 106 with the location of a feature of the displayed content, determine which feature was touched by the user's touch input, and determine suitable tactile output to be provided. Further, in some implementations, the tactile output may begin before a user touches the touch sensor 104, and/or may continue after the user is no longer touching the touch sensor 104.

Tactile output module 718, upon determining the tactile output type, intensity, duration, and so forth, may activate or may provide instructions for activating one or more tactile output components, such as the tactile output components 220 described above. For example, tactile output components 220 may be activated to provide various different types of tactile output. For example, the tactile output may vary, such as varying the direction, intensity or type of the tactile output based on the touch characteristics detected.

Upon determining suitable tactile output, the tactile output module 718 may provide information to or may directly control one or more tactile output components, such as one or more tactile output components 220. As discussed above, the tactile output components 220 may include one or more motive elements for imparting varying levels and intensities of excitation, vibration, oscillation, or the like to the first portion 202 of the electronic device 100. Additionally, in some implementations, the tactile output components 220 may impart the tactile output in a lateral or shear mode, such that the surface being touched is excited or oscillated in a direction that is generally normal to the direction of the touch pressure. For example, in some implementations, the direction of excitation or oscillation may be in one or more directions within a plane of the display or touched surface.

The electronic device 100 may further be equipped with speakers 720 and various other input/output (I/O) components 722. Audio output may be provided through one or more audio speakers 720. For example, audio output from one or more content items 706 may be provided by the content presentation application 710 through speakers 720. Further, the OS and user interface module 708 may also provide audio output through speakers 720 based on various interface functions.

Other I/O components 722 may include various user actuable controls (e.g., physical controls 116-120 discussed above, such as buttons, a joystick, a keyboard, etc.), a microphone, a camera, connection ports, and so forth. For example, the operating system and user interface module 708 of the electronic device 100 may include suitable drivers configured to accept input from the touch sensor, keypad, keyboard, or other user actuable controls and devices included as the I/O components 722. For instance, the user actuatable controls may include page turning buttons, navigational keys, a power on/off button, selection keys, and so on, as discussed above. The electronic device 100 may further include various external controls and input devices in addition to touch sensor 104. For example, some implementations of electronic device 100 may include a virtual or physical keyboard, a pointing stick, touchpad, trackball or joystick type mechanism, a docking station, and various other controls for performing various desired functions.

A communication interface 724 supports both wired and wireless connection to various networks, such as cellular networks, radio, WiFi networks, short-range or near-field networks (e.g., Bluetooth®), infrared signals, and so forth. The communication interface 724 may allow a user of the electronic device 100 to download content items 706 from a content item service, such as a from a website or other online service. The communication interface 724 may further allow a user to access storage on another device, such as a user's computing device, a network attached storage (NAS) device, or the like. For example, a user may download content items to a computing device or NAS and subsequently transfer the content items to the electronic device 100.

Additionally, the electronic device 100 may include removable storage 726. Examples of removable storage 726 include flash memory and memory cards such as secure digital (SD) cards, mini SD cards, micro SD cards, SD high capacity (SDHC) cards, universal serial bus (USB) storage devices, and other removable storage devices and media. For example, a user may insert a removable storage device containing one or more content items, such as for consuming the one or more content items on the electronic device 100 or for transferring the one or more content items to memory 704.

The electronic device 100 may also include a power source 212, such as a battery and power control unit. The power source 212 may operatively control an amount of power, or electrical energy, consumed by the electronic device. Actively controlling the amount of power consumed by the electronic device 100 may achieve more efficient use of electrical energy stored by the power source 212.

The electronic device 100 may have additional features or functionality. For example, the electronic device 100 may also include a hard drive using magnetic, optical, or solid-state storage to store information, various interfaces or ports supporting various protocols, a global positioning system (GPS) device, a PC Card component, a projector, peripheral components, and so forth.

Various instructions, methods and techniques described herein may be considered in the general context of computer-executable instructions, such as program modules stored on computer-readable media, such as memory 704, and executed by the processor 702. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

The electronic device 100 may be configured with functionality to enable consumption of one or more content items of numerous different types or formats including, for example, electronic texts (e.g., documents of any format, electronic periodicals, such as digital magazines and newspapers, etc.), digital audio (e.g., music, audible books, etc.), digital video (e.g., movies, television, short clips, etc.), images (e.g., art, photographs, etc.), electronic maps, and multi-media content. In some implementations, the content presented on the display 102 may take the form of electronic books or "eBooks." For example, the display 102 may depict the text of the eBooks and also any illustrations, tables, maps, or graphic elements that might be contained in the eBooks. The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

Further, as mentioned above, in some implementations, the tactile output may be generated based on metadata provided with the content item. The metadata may specify the type of tactile output to be provided when the content item is consumed on the electronic device. For example, in the case of an eBook, the publisher may specify tactile output to be generated in association with one or more images contained in the eBook. The techniques described herein may be applied in connection with both two-dimensional (2D) and three-dimensional (3D) display technology. For instance, the in the case of a 2D display, the techniques herein can provide a tactile output that simulates a contour, texture, surface irregularity, 3D sensation, or the like, to aid in viewing or interacting with the 2D image. Additionally, in the case of a 3D display, the techniques herein can provide tactile output in correlation with a displayed 3D image for enhancing user interaction with the 3D image. In other implementations, the tactile output module 718 may assign tactile output to various features recognized in a displayed image, such as controls.

Further, in some implementations, a lookup table may be provided as part of other data 712. The lookup table may specify a type of tactile output to be provided based on a detected characteristic of a touch input. For example, if the touch-sensor control module 716 detects that a user's finger is swiping from right to left on a displayed page of text, the tactile output module may determine from the lookup table a series of appropriate tactile output control commands to simulate the texture and sensation of turning a page. The control commands are sent to the motive elements 410 in the tactile output components 220, to cause the tactile output components 220 to provide the desired tactile output. Thus, the lookup table may contain a variety of possible touch input types or gestures, and corresponding tactile output control commands to be sent to the tactile output components 220 for providing various types of tactile output suitable to the touch input or gesture.

In some implementations, the processor 702, the memory 704, the speakers 720, some or all of the other I/O components 722, the communication interface(s) 724, and the removable storage 726 may be located in the second portion 204 described above, and may be included, for example, in the control unit 214. Further, the example electronic device 100 illustrated in FIG. 7 is just one non-limiting example of a suitable electronic device according to some implementations. Numerous other implementations, variations and configurations will be apparent to those of skill in the art in view of the disclosure herein.

Example Process

Figure 8:
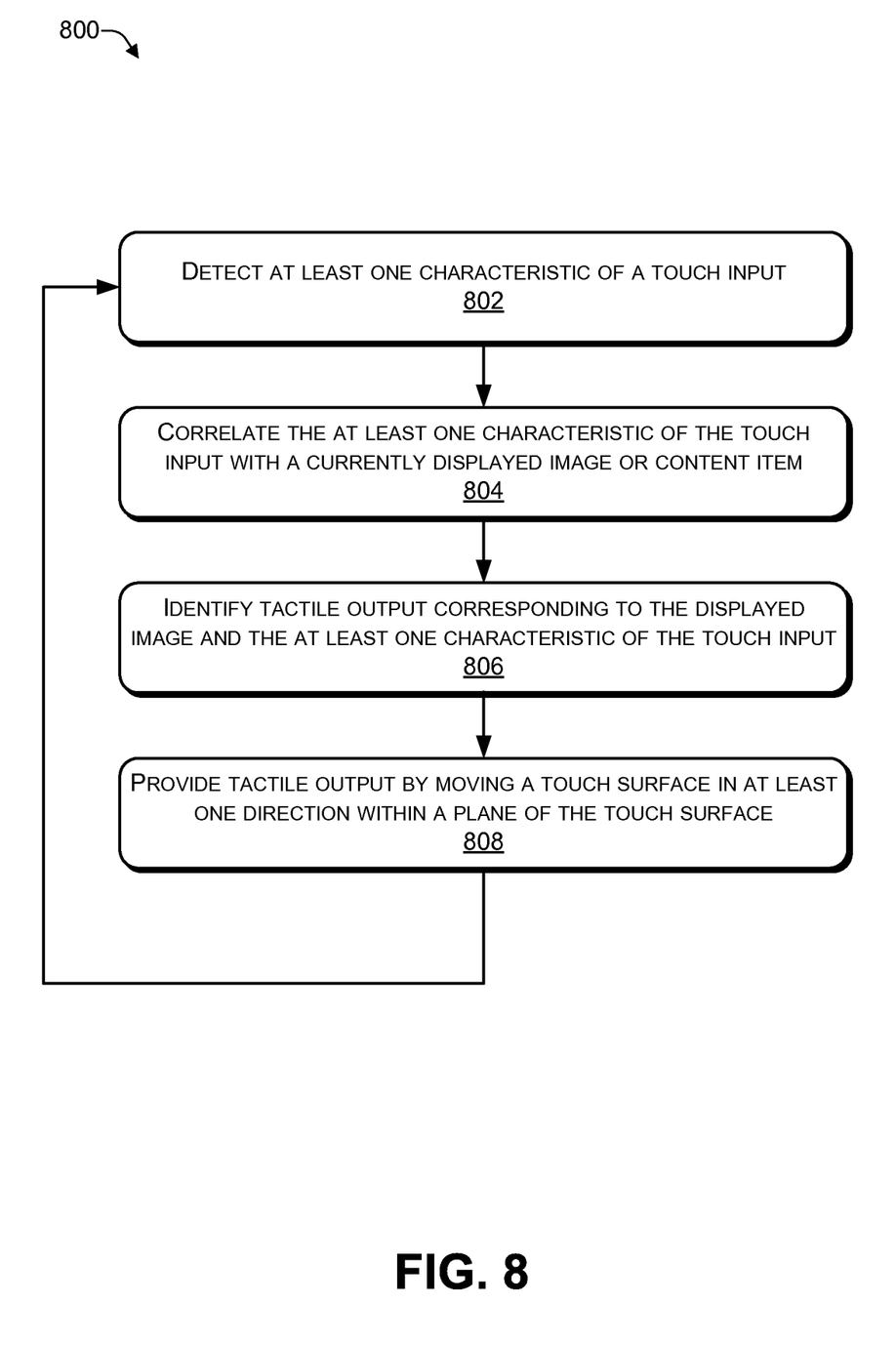
FIG. 8 is a flow diagram illustrating an example process of providing tactile output in a direction that is oblique to a touch input.

FIG. 8 illustrates an example process 800 for implementing the techniques described above of providing tactile output. This process is illustrated as a logical flow diagram, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The process 800 is described with reference to the electronic device 100 of FIGS. 1-7, although other devices, architectures and systems may implement this process.

At block 802, the electronic device detects a touch input. For example, a touch sensor may be associated with a display, and may detect one or more characteristics of a touch input, such as may be made by a finger of a user touching the display and/or touch sensor. For example, detected characteristics may include a location of the touch input, an amount of force of the touch input, a direction of the touch input, a rate of the touch input, a duration of the touch input, and the like.

At block 804, the at least one characteristic of the touch input is correlated with the displayed image or content item. For example, tactile output module 718 may determine a suitable tactile output based on the at least one detected characteristic of the touch input or other user interaction with the electronic device 100. In some implementations, a content item may be authored, programmed, or otherwise have predetermined tactile output specified to be provided or generated by the electronic device when a particular touch input is detected, such as at the location of a particular feature of the content item rendered on the display. Additionally some types of tactile output may be specified as part of the user interface for various types of touch inputs independent of any content item being displayed.

At block 806, the electronic device determines the tactile output to be provided based on the at least one characteristics of the touch input and the currently displayed image. For example, in some implementations, the tactile output is determined from metadata of the image. In other implementations, the tactile output may be determined from a lookup table for various touch inputs, or the like. As mentioned above, a huge variety of different touch input characteristics, such as location of touch in general, location of touch with respect to displayed features, direction of touch movement, rate of touch movement, duration of touch, pressure of touch, and the like may be determined in various combinations, gestures, and the like. Various different combinations detected by correspond to various different tactile outputs.

At block 808, tactile output may be provided by moving a touch surface in a lateral direction generally within the plane of the touch surface. For example, in some implementations, a vibration or excitation of the touch surface may be provided by one or more tactile output components in at least one direction in the plane of the display. Thus, the touch surface may be oscillated in a shear mode in at least one direction in an x-y plane corresponding to the touch surface, while virtually no movement is permitted in the z-axis direction. Consequently, the one or more directions of oscillation are generally normal to a direction of pressure applied by a user's finger when touching the touch surface. As mentioned above, movement in the z-axis direction can cause undesirable noise, often exacerbated by a loudspeaker type pressure waves due to the planar nature of the touch surface. By generally limiting the tactile output to lateral movement in directions within the plane of the touch surface, the noise and loudspeaker effect may be reduced or eliminated. Alternatively, however, in other implementations, a z-axis tactile output component may also be provided that can selectively oscillate the touch surface in the z-axis direction as well to achieve certain tactile output effects, such as in combination with oscillation in the x-axis and/or y-axis directions. Numerous other variations will be apparent to those of skill in the art in light of the disclosure herein. Further, the example process 800 of FIG. 8 may be a continual process, such that as subsequent touch inputs are received at block 802, suitable subsequent tactile outputs are provided at block 808.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
    a first portion including a display, a touch sensor, and a touch surface;

a second portion connected to the first portion by one or more connection elements that enable relative movement between the first portion and the second portion in at least one direction within an x-y plane corresponding to the touch surface; and at least one tactile output component for moving the first portion relative to the second portion in the at least one direction within the x-y plane corresponding to the touch surface to provide tactile output, wherein, during the tactile output, movement of the touch surface in a z-axis direction, normal to the x-y plane, is negligible in comparison with movement of the touch surface in at least one of an x-axis direction or a y-axis direction within the x-y plane.

2. The device as recited in claim 1, further comprising a power source and a processor located in the second portion, the processor operatively coupled to computer-readable media.

3. The device as recited in claim 2, further comprising a tactile output module stored in the computer-readable media and executed on the processor to control the at least one tactile output component for providing the tactile output in the at least one of the x-axis direction or the y-axis direction.

4. The device as recited in claim 3, further comprising a touch-sensor control module stored in the computer-readable media and executed on the processor to:

detect at least one characteristic of a touch input to the touch sensor; and provide information regarding the at least one characteristic to the tactile output module for determining a type of tactile output to provide in response to the touch input.

5. The device as recited in claim 4, wherein the tactile output module determines the type of tactile output based on at least one of:

tactile output information corresponding to the at least one characteristic maintained in a lookup table; or metadata corresponding to a media content item currently being consumed on the device.

6. The device as recited in claim 1, wherein:

the second portion includes a plurality of the tactile output components; and a first tactile output component oscillates the touch surface in the x-axis direction and a second tactile output component oscillates the touch surface in the y-axis direction.

7. The device as recited in claim 1, wherein the touch surface includes, or is in contact with, at least one of a surface of the display or a surface of the touch sensor.

8. The device as recited in claim 1, wherein:

the one or more connection elements include one or more springs connecting the first portion to the second portion; and the one or more springs are able to flex laterally to provide relative movement between the first portion and the second portion.

9. The device as recited in claim 1, wherein the one or more connection elements include one or more bearing balls positioned to enable relative lateral movement between the first portion and the second portion while maintaining a constant gap between the first portion and second portion.

10. The device as recited in claim 1, further comprising a seal disposed along a perimeter of a gap between the first portion and the second portion, the seal comprising a brush seal.

11. The device as recited in claim 1, further comprising a seal disposed along a perimeter of a gap between the first portion and the second portion, the seal comprising one or more flexible tapered seals.

12. The device as recited in claim 1, wherein the tactile output component comprises:

a linkage extending from the second portion into contact with the first portion; and a motive element for oscillating the linkage to impart movement into the first portion relative to the second portion.

13. The device as recited in claim 12, wherein the motive element comprises at least one of:

a piezoelectric element;

a solenoid;

an artificial muscle element;

an electric motor;

a fluid motor; or a transducer.

14. The device as recited in claim 1, wherein the first portion is environmentally sealed and the second portion is environmentally sealed, the device further comprising a flexible connection extending between the first portion and the second portion for transmitting at least one of power or data.

15. A device comprising:

a first portion having a touch surface;

a second portion connected to the first portion by one or more connection elements that enable lateral movement of the first portion relative to the second portion; and at least one tactile output component for providing lateral oscillation of the touch surface in at least one direction within a plane formed by the touch surface, wherein an amount of the lateral movement of the first portion relative to the second portion is greater than an amount of movement of the first portion toward or away from the second portion.

16. The device as recited in claim 15, wherein the at least one tactile output component comprises: a first tactile output component configured to provide the lateral oscillation in a first direction within the plane formed by the touch surface; and a second tactile output component configured to provide the lateral oscillation in a second direction within the plane formed by the touch surface.

17. The device as recited in claim 16, wherein the lateral oscillation comprises oscillation of the touch surface in multiple directions within the plane formed by the touch surface.

18. The device as recited in claim 15, wherein the at least one tactile output component is disposed in the second portion and includes a linkage extending into contact with the first portion to impart the lateral oscillation to the touch surface.

19. The device as recited in claim 18, wherein the at least one tactile output component comprises at least one motive element for oscillating the linkage of the tactile output component, wherein at least one of frequency or amplitude of oscillation of the linkage is controlled through the motive element.

20. The device as recited in claim 15, further comprising a touch-sensitive display in the first portion, the touch-sensitive display including the touch surface or contacting the touch surface.

21. The device as recited in claim 15, further comprising a power source and a control unit in the second portion.

22. The device as recited in claim 15, wherein the one or more connection elements permit the lateral movement of the first portion relative to the second portion while restricting movement of the first portion toward or away from second portion.

23. The device as recited in claim 22, wherein the one or more connection elements comprise one or more spring connectors able to flex to permit the lateral movement of the first portion relative to the second portion.

24. The device as recited in claim 22, wherein the one or more connection elements comprise one or more bearing balls for maintaining a gap between the first portion and the second portion during the lateral movement of the first portion relative to the second portion.

25. A method comprising:
under control of an electronic device configured with specific executable instructions and having a first portion with a touch surface,
providing tactile output by oscillating the first portion relative to a second portion of the electronic device, wherein the oscillating is in at least one direction within a plane of the touch surface; and
during the providing the tactile output, restricting movement of the first portion relative to the second portion in a direction normal to the plane of the touch surface, wherein an amount of movement of the first portion relative to the second portion in the direction normal to the plane of the touch surface is less than an amount of movement in the at least one direction within the plane of the touch surface.

26. The method as recited in claim 25, wherein providing the tactile output comprises oscillating the first portion with the touch surface in multiple directions within the plane of the touch surface.

27. The method as recited in claim 25, wherein the oscillating the first portion includes moving of the touch surface normal to a direction of pressure applied by a user's finger touching the touch surface to receive the tactile output.

28. The method as recited in claim 25, further comprising detecting at least one characteristic of a touch input on the touch surface;
correlating the at least one characteristic with a currently displayed image or content item; and
identifying the tactile output to be provided based, at least in part, on the at least one characteristic and the displayed image or content item.

29. The method as recited in claim 28, wherein:
the content item includes an image rendered on the display; and
the identifying the tactile output to be provided includes identifying a type of tactile output specified by metadata associated with the content item.

30. The method as recited in claim 28, wherein the identifying the tactile output includes using the at least one characteristic when referring to a lookup table for identifying, at least in part, the tactile output.

31. The method as recited in claim 25, further comprising:
using a tactile output component on the second portion of the electronic device to impart the tactile output to the touch surface by oscillating the first portion of the electronic device relative to the second portion.

32. The method as recited in claim 25, further comprising:
using a first tactile output component to oscillate the first portion relative to the second portion in a first direction within the plane of the touch surface; and
using a second tactile output component to oscillate the first portion relative to the second portion in a second direction within the plane of the touch surface, wherein the second direction is normal to the first direction.

\* \* \* \* \*